Oct. 9, 1962 F. P. ALLES 3,057,722
PHOTOGRAPHIC STRIPPING FILM
Filed Aug. 7, 1958
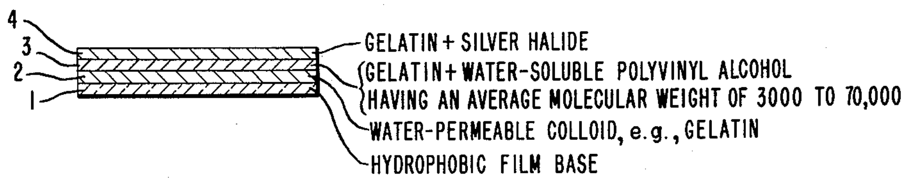
INVENTOR
FRANCIS PETER ALLES
BY Weston B. Wardell Jr.
ATTORNEY United States Patent Office 3,057,722

Patented Oct. 9, 1962

3,057,722
PHOTOGRAPHIC STRIPPING FILM

Francis Peter Alles, Westfield, N.J., assignor to E. I. du Pont de Nemours and Company, Wilmington, Del., a corporation of Delaware

Filed Aug. 7, 1958, Ser. No. 753,631
2 Claims. (Cl. 96—83)

This invention relates to the art of photography and more particularly to photographic stripping films for the graphic arts. More particularly it relates to such films which are presensitized and suitable for use in making gelatin reliefs for photogravure and like reproduction processes. Still more particularly this invention relates to gravure resists useful in making intaglio printing elements and the preparation of such elements.

In the photogravure process it has been the custom to use so-called "carbon tissues" which consist of a pigmented gelatin coating on paper. This material has no inherent sensitivity to light and hence must be sensitized by the user in a bichromate solution. The bichromated gelatin system has various disadvantages which are well known to those skilled in the art including long exposures to light because of their low sensitivity and a limited scale of tones. Another disadvantage is that of poor dimensional stability.

In more recent developments, it has been proposed to overcome some of the disadvantages of the "carbon tissues" by using a gelatin silver halide emulsion coated on a water-insoluble protective or so-called permanent film which in turn is attached to a temporary film or paper base by means of a stripping layer. Such stripping elements are disclosed, for example, in Boyer U.S. Patent 2,650,877 and Boyer et al. U.S. Patent 2,650,878.

Stripping films of this type offer considerable advantages, such as in time saving, over the "carbon tissues," but also have some attendant disadvantages. For example, after such a stripping element is exposed, developed, adhered to the printing member with the image layer face down, and the temporary support srtipped from the film element, it then becomes necessary to remove the water-insoluble protective or so-called permanent support with a special solvent. The solvent does not always completely remove this supporting layer and several difficulties result from this inadequate removal. For example, the usual warm water treatment will not form a good quality gelatin relief image and consequently a poorly etched plate will be the final result of the procedure.

An object of this invention is to provide an improved presensitized photographic stripping film for making gelatin relief images. A further object is to provide such a film which can be used in the photogravure process in place of the "carbon tissues" and the disadvantages presensitized films described in the preceding paragraph. A still further object is to provide such a film having proper stripping properties. A preferred embodiment of this invention has for its particular object the provision of a photographic stripping film having excellent relief characteristics and outstanding dimensional stability. Still other objects will be apparent from the following description of the stripping film.

The presensitized stripping film of this invention as shown in the drawing which constitutes a part of this specification comprises a hydrophobic film base 1 having a surface coating, or substratum, of a thin layer of a water-permeable colloid 2 e.g., albumin, agar-agar, or preferably gelatin, on which is coated a stripping layer 3 composed of an aqueous composition of two essential ingredients: (1) gelatin, and (2) water-soluble polyvinyl alcohol, which in turn is coated with a gelatino silver halide emulsion layer 4. A suitable water-soluble hydroxyl polymer is polyvinyl alcohol.

It is important that the gelatin and polyvinyl alcohol polymer essential ingredients (1) and (2) be present in the composition in a ratio by weight of from 1 to 10, and preferably 2 to 7, parts of gelatin for each part of the water-soluble polyvinyl alcohol.

Particularly outstanding characteristics of lack of brittleness, ease in wet handling, and satisfactory strippability are obtained according to this invention by the use of polyvinyl alcohol in the stripping layer.

The gelatin in the critical stripping layer composition according to this invention is so selected that it is a gel at normal photographic processing temperatures, i.e., on the order of 20° C. The water-soluble polyvinyl alcohol preferably has a relatively low viscosity, such as on the order of 2–30 centipoises for a 4% aqueous solution at 20° C. The concentration of the stripping layer material at coating is preferably approximately 5 to 7% by weight.

The polyvinyl alcohol is characterized by preventing migration of the polyvinyl alcohol from the stripping layer, or loss by leaching during photographic processing. By being water-soluble and non-migratory, the polyvinyl alcohol controllably reduces the cohesive strength of the gelatin and hence the gel strength of the stripping layer at low water concentrations and elevated temperature. The polyvinyl alcohol preferably has an average molecular weight of greater than about 1,500, and preferably from 3,000 to 70,000. The gelatin and polyvinyl alcohol composition has proven particularly advantageous in its lack of deleterious photographic effects.

The thickness of the stripping layer of this invention can vary according to the conditions of intended use and the nature of the effect desired, as will be understood in the art. Generally, the thickness has been found particularly satisfactory within the range from 0.06 mil to 0.35 mil. A particularly preferred average thickness is 0.2 mil.

The photographic stripping film of this invention can be made using conventional photographic film manufacturing equipment and techniques. In order to take full advantage of the novel stripping layers of this invention, it is preferable to coat the silver halide emulsion over the stripping layer, after the stripping layer has been dried. It is also preferable to coat the silver halide emulsion onto the stripping layer at the lowest practical temperature, i.e., about 32–34° C. in order to keep the intermixing of the stripping layer and the emulsion layer at a minimum.

The hydrophobic film base useful in the stripping film of this invention may be composed of such well known film-forming materials as cellulose derivatives, e.g., cellulose nitrate, cellulose triacetate, cellulose acetate, cellulose propionate, cellulose acetate butyrate; polyvinyl chloride, polyvinyl chloride/acetate; polyvinyl acetals, e.g., from formaldehyde and acetaldehyde; super polyesters from dicarboxylic acid and dihydric alcohols, e.g., oriented sheets of polyethylene terephthalate having melting points above 200° C. The latter is the preferred film base material because of its strength and particularly because of the outstanding advantages imparted to the stripping film due to its dimensional stability. The preferred film base can, and preferably does, have a surface coating of a copolymer of vinylidene chloride/acrylonitrile/itaconic acid of the type disclosed in Alles et al. U.S. Patent 2,627,088 and Alles U.S. Patent 2,779,684.

The light sensitive gelatino silver halide emulsion layer should be relatively soft and not contain any of the conventional photographic hardeners, i.e., capable of being later differentially hardened in a developing or bleaching bath so that a relief image can be formed by washing away unhardened emulsion. In addition, the ratio of gelatin to silver halide is preferably high, i.e., a relatively large quantity of gelatin to a relatively small quantity of silver halide. A satisfactory range is from 2 to 5 parts of gelatin to one part of silver halide.

The films can have other layers, as will be understood, such as filter layers, antihalation layers, etc.

Various types of dyes and/or pigments can be used in the emulsion layer, but they should preferably be of a color which will contrast with the reflectance from the metal surface of the plate or cylinder member to which the gelatin emulsion layer is attached in making a gelatin "resist." The surface is usually brightly polished copper and the dye or pigment may be yellow, orange, orange-red, brown, etc. The coloring matter serves as a visual aid to staging and etching operators when there is sufficient contrast to outline details of the relief images.

Various photographic sensitizing dyes can be added to the photographic emulsion if desired to extend the sensitivity in the spectrum. There are a large number of such dyes known and available and they include the simple cyanine, carbocyanine, pseudocyanine, kryptocyanine, merocyanine, and styryl dyes, etc.

The present invention will be further illustrated and explained but is not intended to be limited by the following examples, wherein the parts and percentages indicated are by weight unless otherwise indicated.

*Example 1*

An aqueous gelatin solution was prepared which gave a viscosity of 4.7 centistokes at 60° C. using a 6⅔% solution. The solution was prepared using the following ingredients:

| | | |
|---|---|---|
| Gelatin | grams | 70 |
| 20% KCl | ml | 2 |
| 5% saponin | ml | 16 |
| Ethyl alcohol | ml | 32 |
| 13% thymol | ml | 2 |
| 43% glycerine | ml | 4.5 |
| Water | ml | 1400 |

To two 100 ml. portions of the above solution there were added respectively 5 and 10 ml. of a 20% aqueous solution of polyvinyl alcohol. The polyvinyl alcohol was 98.5–100% hydrolyzed and the viscosity of a 4% aqueous solution was 4 to 6 centipoises at 20° C. as determined by means of the Hoeppler falling ball method.

Each of the above solutions was coated at 35° C. onto 4 mil thick polyethylene terephthalate film supports made according to Example 1 of Alles et al. U.S. Patent 2,627,088 and dried at room temperature. The coating weight of the resulting layers was about 70 mg./dm.$^2$. On each of these two coated films there was coated at 31° C. an ortho-chromatically sensitized gelatino silver chlorobromide emulsion containing 25 mole percent of silver chloride. The coating weight of the resulting emulsion layer was about 62 mg. of silver halide per square decimeter. The emulsion coating was also dried at room temperature and the dry anchorage of the layers was found to be satisfactory.

The samples were given a flash exposure to light and processed as follows:

(1) Immersion for 3 minutes at 20° C. in a solution of the following composition:

| | | |
|---|---|---|
| Sodium metabisulfite | grams | 5 |
| Sodium sulfite | do | 10 |
| Metol | do | 1 |
| Hydroquinone | do | 2 |
| Pyrogallol | do | 6 |
| Potassium bromide | do | 3 |
| Anionic wetting agent (Eumercin NB 10% aqueous, a water-soluble phosphorated alcohol of the anionic type manufactured by the Warwick Chemical Co., Wood River Junction, Rhode Island) | ml | 2 |
| Water to make 1000 ml. | | |

(2) Immersion for 2 minutes at 20° C. in a solution of the following composition:

| | | |
|---|---|---|
| Sodium carbonate (monohydrate) | grams | 100 |
| Anionic wetting agent (Eumercin NB 10% aqueous, a water-soluble phosphorated alcohol of the anionic type manufactured by the Warwick Chemical Co., Wood River Junction, Rhode Island) | ml | 2 |
| Water to make 1000 ml. | | |

(3) Wash 1 minute in water at 20° C.

(4) Fix for 3 minutes at 20° C. in a solution having the following composition:

| | | |
|---|---|---|
| Sodium thiosulfate | grams | 200 |
| Boric acid | do | 15 |
| Water to make 1000 ml. | | |

(5) Wash for 10 minutes in water at 20° C.

The two samples were dried and layed emulsion side down on clean water-wet copper plates at a speed of about 40 inches per minute. The plates with the films attached were immersed in water at 48° C. for 1 minute at which time the film support of each was easily separated from the emulsion layer. The copper plates were then immersed in water at 125° F. for 10 minutes to dissolve away all unexposed unhardened gelatin, thus forming a relief image of varying thickness of hardened gelatin on the copper, in relation to the silver densities. After thoroughly drying the gelatin relief image and covering over the bare areas of copper with asphaltum as is common practice in the art, the relief images were etched into the copper. Normal gravure etching procedure was used, by employing conventional ferric chloride etching solutions. Satisfactory etching was obtained, resulting in printing plates that produced prints of good quality.

*Example 2*

Another set of samples were coated, exposed and processed as in Example 1 with the exception that 5, 7.5, and 10 ml. of a 20% polyvinyl alcohol solution were added to 100 ml. portions of the gelatin solution. All of the samples could be satisfactorily stripped in water at 48° C., although the sample containing 5 ml. of polyvinyl alcohol was somewhat harder to strip, indicating an approach to the lower limit of the ratio of polyvinyl alcohol to gelatin.

Although only gelatin silver chlorobromide emulsions have been used in the examples, it will be obvious that other photographic silver halide emulsions can be used, such as silver chloride, silver bromide, silver iodobromide, etc.

An advantage of the films is that they are commercially practical and can be made with conventional coating equipment of photographic manufacturers. Another advantage is that the stripping layer has adequate adhesion when dry in the form of raw stock, or wet during processing. A further advantage is that the stripping layer allows the support to be readily stripped from the emulsion after lay-down on a water-wetted copper printing element and the temperature is raised by immersion of the element in water having a temperature of about 45° to 60° C. A particular advantage of the preferred embodiment of the stripping film according to this invention wherein the support is polyethylene terephthalate is its dimensional stability. A still further advantage is that the films of this invention can reproduce a wide range of tones. Still other advantages will be apparent from the above description of the invention.

What is claimed is:

1. A photographic stripping film comprising a hydrophobic film base having one surface coated in order with (*a*) a thin layer of gelatin, (*b*) a stripping layer consisting of (1) gelatin characterized by being a gel at normal photographic processing temperatures, and (2) a water-soluble polyvinyl alcohol having an average molecular weight of 3,000 to 70,000, said ingredient (1) being present in said stripping layer in a ratio of 1 to 10 parts by weight per part of ingredient (2), and (c) an unhardened gelatino-silver halide emulsion layer, said film being characterized by having layer (b) adjacent to layer (c).

2. A photographic stripping film as set forth in claim 1 wherein said film base is polyethylene terephthalate.

References Cited in the file of this patent

UNITED STATES PATENTS

| | | |
|---|---|---|
| 2,462,151 | Woodward | Feb. 22, 1949 |
| 2,462,503 | Jennings | Feb. 22, 1949 |
| 2,606,835 | Jennings | Aug. 12, 1952 |
| 2,615,807 | Umberger | Oct. 28, 1952 |
| 2,756,145 | Ballard et al. | July 24, 1956 |